United States Patent
Goubard et al.

(10) Patent No.: US 11,492,518 B2
(45) Date of Patent: Nov. 8, 2022

(54) SELF-ADHESIVE COMPOSITION FOR THE BONDING OF SUBSTRATES WITH LOW SURFACE ENERGY

(71) Applicant: BOSTIK SA, Colombes (FR)

(72) Inventors: David Goubard, Compiegne (FR); Olivier Laferte, Trosly Breuil (FR)

(73) Assignee: BOSTIK SA, Colombes (FR)

( * ) Notice: Subject to any disclaimer, the term of this patent is extended or adjusted under 35 U.S.C. 154(b) by 443 days.

(21) Appl. No.: 16/344,067

(22) PCT Filed: Oct. 24, 2017

(86) PCT No.: PCT/FR2017/052925
§ 371 (c)(1),
(2) Date: Apr. 23, 2019

(87) PCT Pub. No.: WO2018/078271
PCT Pub. Date: May 3, 2018

(65) Prior Publication Data
US 2019/0256745 A1    Aug. 22, 2019

(30) Foreign Application Priority Data
Oct. 28, 2016 (FR) ....................... 1660509

(51) Int. Cl.
| | |
|---|---|
| *C09J 7/38* | (2018.01) |
| *C09J 7/25* | (2018.01) |
| *C09J 11/08* | (2006.01) |
| *C08G 18/75* | (2006.01) |
| *C09J 7/20* | (2018.01) |
| *C08G 18/48* | (2006.01) |
| *C08G 18/10* | (2006.01) |
| *C09J 175/08* | (2006.01) |

(52) U.S. Cl.
CPC ................ *C09J 7/38* (2018.01); *C08G 18/10* (2013.01); *C08G 18/4825* (2013.01); *C08G 18/755* (2013.01); *C09J 7/20* (2018.01); *C09J 7/255* (2018.01); *C09J 11/08* (2013.01); *C09J 175/08* (2013.01); *C09J 2301/408* (2020.08); *C09J 2425/00* (2013.01); *C09J 2471/00* (2013.01); *C09J 2475/00* (2013.01); *C09J 2493/00* (2013.01)

(58) Field of Classification Search
CPC ....... C09J 7/38; C09J 7/20; C09J 7/255; C09J 11/08; C09J 175/08; C09J 2493/00; C09J 2425/00; C09J 2301/408; C08G 18/10; C08G 18/4825; C08G 14/755
See application file for complete search history.

(56) References Cited

U.S. PATENT DOCUMENTS

| | | | |
|---|---|---|---|
| 8,247,514 B2 * | 8/2012 | Griswold | C08G 18/289 528/29 |
| 2002/0012759 A1 * | 1/2002 | Asayama | B31F 1/0077 428/34.2 |
| 2007/0123662 A1 | 5/2007 | Ueda et al. | |
| 2011/0052912 A1 * | 3/2011 | Poivet | C08L 75/04 428/355 N |
| 2015/0166858 A1 | 6/2015 | Goubard | |
| 2015/0184043 A1 | 7/2015 | Goubard et al. | |
| 2015/0184045 A1 | 7/2015 | Goubard et al. | |
| 2016/0159942 A1 * | 6/2016 | Michaud | C08F 2/38 525/288 |

FOREIGN PATENT DOCUMENTS

| | | | | |
|---|---|---|---|---|
| EP | 2310470 A1 | 4/2011 | | |
| EP | 2639280 A1 * | 9/2013 | ............ | C09J 193/04 |
| EP | 2889348 A1 | 7/2015 | | |
| EP | 2889349 A1 | 7/2015 | | |
| EP | 3263660 B1 * | 12/2019 | ........... | C09D 11/328 |
| FR | 3015984 A1 | 7/2015 | | |
| JP | 2015129280 A | 7/2015 | | |
| JP | 2015131957 A | 7/2015 | | |
| JP | 2015526547 A | 9/2015 | | |
| WO | 2005073334 A1 | 8/2005 | | |
| WO | 2010002557 A1 | 1/2010 | | |
| WO | 2013163108 A1 | 9/2013 | | |

OTHER PUBLICATIONS

ISA/EP; International Search Report and Written Opinion for International Application No. PCT/FR2017/052925 dated Nov. 12, 2017, 10 pages.
JPO; Notice of Reasons for Rejection for Japanese Patent Application No. 2019-523787 dated Jul. 6, 2021, 2 pages.

\* cited by examiner

*Primary Examiner* — Scott R. Walshon
(74) *Attorney, Agent, or Firm* — NK Patent Law

(57) ABSTRACT

A hot-melt adhesive composition comprises a mixture of silylated polymers, a tackifying resin and a catalyst, in specific contents, having self-adhesive properties after crosslinking to moisture. A self-adhesive article comprises a support layer and at least one self-adhesive layer obtained after crosslinking to the moisture in the adhesive composition according to the invention. The self-adhesive article can be used to bond low-energy substrates, in particular plastic substrates, notably thermoplastic substrates having low surface energy.

14 Claims, No Drawings

SELF-ADHESIVE COMPOSITION FOR THE BONDING OF SUBSTRATES WITH LOW SURFACE ENERGY

CROSS-REFERENCE TO RELATED APPLICATIONS

This application is a U.S. National Stage application of International Application No. PCT/FR2017/052925, filed on Oct. 24, 2017, which claims the benefit of French Patent Application No. 1660509, filed Oct. 28, 2016.

FIELD OF INVENTION

The present invention relates to a hot-melt adhesive composition comprising a mixture of silylated polymers, a tackifying resin and a catalyst, in specific percentages, having self-adhesive properties after crosslinking with moisture.

The present invention also relates to a self-adhesive article such as a self-adhesive multi-layer system, comprising a support layer and at least one self-adhesive layer obtained after crosslinking to the moisture of the adhesive composition according to the invention.

The present invention also relates to the use of the adhesive composition according to the invention in the crosslinked state and the self-adhesive article according to the invention for bonding low surface energy substrates, in particular plastic and notably thermoplastic substrates with low surface energy.

TECHNOLOGICAL BACKGROUND OF THE INVENTION

Hot melt (HM) adhesives are substances that are solid at room temperature and contain neither water nor solvent. They are applied in the molten state and solidify upon cooling, thereby forming a seal which ensures the bonding of the substrates to be assembled. Some Hot Melts are formulated to give a relatively hard and tack-free character to the carrier coated with the melt. Other Hot Melts give the carrier a relatively soft character and substantial tack: these are PSAs which are widely used manufacturing self-adhesive labels; the corresponding adhesives are referred to as "Hot Melt Pressure Sensitive Adhesive" (or HMPSAs).

Pressure-sensitive adhesives (also referred to as self-adhesive glues or PSAs) are substances that provide instantaneous tack at room temperature, to the support layer coated with the adhesive, which allows its instantaneous adhesion to the substrate when subjected to a slight and brief pressure. PSAs are widely used for manufacturing labels or self-adhesive films that are temporarily or permanently attached to articles for the purpose of presenting information (such as bar codes, names, and prices) and/or for decorative purposes. PSAs are also used to ensure durable labelling of electrical, electronic or mechanical parts on which information must be affixed for long periods of time—several years—and/or in difficult conditions of use involving solvents, chemicals, natural or artificial light, and radiation, with regular or occasional movement and deformation by humans or machines. They are also used in the production of self-adhesive tapes for various uses. In addition to the transparent adhesive tape widely used in daily life, PSAs are used, for example, in the construction of objects or buildings; in various industrial applications such as shaping and assembling cardboard packaging; to protect surfaces for paint work in the construction sector; to support electrical cables in the transport industry; in double-sided adhesive tape used to secure carpeting; to assemble components or equipment in the automotive, construction, textile, wood and plastics industries; and to assemble electrical or electronic devices, tools and equipment used by professionals or the general public.

In manufacturing multilayer systems, particularly labels and/or self-adhesive tapes, PSAs are often applied by continuous coating processes to the entire surface of a large support layer (printable where applicable), in an amount (usually expressed in g/m$^2$ hereinafter referred to as "weight per unit area". The support layer is comprised of one or more layers of paper or film made of a polymeric material. The adhesive layer covering the support layer can itself be covered with a protective non-stick layer (often referred to as a "release liner"), composed for example of a silicone film; The resulting multilayer system is generally packaged by winding it into large reels up to 2 metres wide and 1 metre in diameter, which can be stored and transported.

These multilayer systems can subsequently be converted into self-adhesive labels for use by the end user, by means of conversion processes that include printing the desired informative and/or decorative elements on the printable side of the support layer, and then cutting it to the desired shape and size. The protective release liner can be easily removed without modifying the adhesive layer which remains fastened to the support layer. After separation from its protective release liner, the label is affixed to the substrate surface to be to which it is to be affixed, either manually or using a labelling machine on automated packaging lines.

These multilayer systems can also be converted into self-adhesive tapes by cutting and packaging in rolls of predetermined width and length.

Due to their high tack at room temperature, PSAs generally enable rapid bonding or adhesion of the label and/or self-adhesive tape to the substrate to be to which it is to be affixed, which is suitable for obtaining high industrial production rates.

The nature of the surface of a substrate can be characterized by its surface energy. This can be quantified in a manner that is well known to the person skilled in the art, from the measurement of the contact angle and calculated according to the Owens & Wendt model.

For a comparable surface area, a PSA composition suitable for bonding on substrates with high surface energy (or surface tension), such as glass or metals which are inorganic polar substrates, will not necessarily be suitable for bonding on substrates with low surface energy such as those comprising polymeric materials based on ethylene- or propylene-type monomers and comonomers, commonly known, respectively, as polyethylene (PE) and polypropylene (PP) substrates, which are polar organic substrates.

Also included in the category of low surface energy substrates are polymeric materials based on other olefin monomers, and in general all coatings on films or objects which are difficult to bond with PSAs.

Low surface energy substrates such as those referred to above are known to be difficult to bond and often require specific treatment of said surface prior to laminating the self-adhesive part of the label or adhesive tape. These treatments are well known to the person skilled in the art and consist of chemically and/or physically modifying the surface of the substrate to increase the surface energy and/or the roughness of said surface and thereby improve the adhesion of the adhesive to the substrate. For example, the surface of the substrate can be treated by a plasma or corona process, by abrasion, or by applying a chemical adhesion agent (also called a primer) to the surface to be treated, in order to modify the surface energy of the substrate favourably.

Without such surface treatments, the adhesion of the adhesive layer to a substrate of this type is often insufficient to bond the label or adhesive tape to the surface of said substrate effectively. The effectiveness of such bonding is to be considered according to the intended type of use. Typically, it is desirable that the adhesive bond ensuring the attachment of the two objects has a minimum resistance when subjected to or more of the following stresses: peeling, pulling, or shearing. It is also desirable that these properties remain consistent under a wide range of temperatures, particularly when the adhesive bond (and consequently the product bearing the label and/or adhesive tape) is likely to be subjected to temperature variations, for example during transport, storage and use. It is also desirable that these advantageous properties do not deteriorate over time or are at least maintained for a sufficiently long time, in relation, for example, to the use or service life of the self-adhesive article or of the product to which said self-adhesive article is attached. In some applications, a certain rupture profile of the adhesive bond is sought with respect to the substrate surface. Preferentially, a uniform rupture of the adhesive bond is sought, rather than an intermittent one.

For example, patent application FR3015984 describes self-adhesive articles comprising a conformable foam type support layer that can be obtained from adhesive compositions based on polyether or silylated polyurethane(s) or on a mixture of special silylated polyethers or polyurethanes.

These self-adhesive articles are described as being bondable to many surfaces, including plastic materials or surfaces having properties comparable to those of the substrate layer.

However, the adhesive compositions described in these applications proved not to be entirely satisfactory and remain to be improved in terms of adhesive performance or bonding efficacy on low surface energy substrates.

However, in some areas of application of PSAs, it is not desirable to use the aforementioned surface treatments to offset the poor adhesive performance of the adhesive composition with regard to these substrates. Indeed, one of the drawbacks of these treatments is that they require an additional step in the process of manufacturing the product to which a self-adhesive article is attached, thus generating additional costs and constraints in the production lines of these products. In addition, by modifying the physicochemical properties of the substrate surfaces, these treatments can weaken the substrate surface or induce aesthetically undesirable effects such as loss of transparency or a change in the surface colour of the substrate, which can be problematic when the support layer of self-adhesive article is for example transparent or translucent, as the substrate surface is then visible. These treatments can also lead to heterogeneous surfaces and to poorly reproducible, short-lived bonding, which can require a repeat treatment of the substrate surface prior to affixing the adhesive portion of the self-adhesive article.

Thus, in recent years, new self-adhesive bonding solutions adapted to the manufacture of self-adhesive labels suitable for bonding to low surface energy substrates have appeared.

For example, acrylate polymer (or copolymer)-based pressure sensitive adhesive compositions are known, such as the ones described in patent application EP 2310470 3M.

However, the preparation of these polymers and their use in the formulation of the adhesive compositions requires using a large amount of solvent, which proves burdensome for the production of self-adhesive articles because it requires an additional step of removing the solvent and/or the installation of specifically-dedicated equipment, as the case may be. In addition, the use of acrylic polymers also has the drawback of generating unpleasant odours due to the presence of residual monomers or residual solvents.

There is thus a need to develop new pressure sensitive adhesive compositions that can bond to any surface, including low surface energy substrates that are known to be difficult to bond, without presenting any or all of the drawbacks of the prior art.

It has now been found that the composition according to the present application allows more effective bonding to all types of surfaces, including low surface energy substrates, regardless of surface conditions.

In particular, the adhesive composition according to the invention has, in the crosslinked state, improved adhesive performance, especially in terms of cohesion, on low surface energy substrate surfaces, for comparable surface conditions, with regard to pressure sensitive adhesive compositions of the prior art based on disilylated polymers alone (i.e., comprising no monosilylated polymer).

In particular, the adhesive composition according to the invention has, in the crosslinked state, excellent adhesion performance for bonding surfaces of substrates based on low surface energy plastics, preferably at least comparable to the performances measured for the current acrylic-type self-adhesive solutions.

In particular, the adhesive composition according to the invention has, in the crosslinked state, an adhesive strength, measured according to the peel test at 1800, of at least 3 N/cm, preferably at least 3.5 N/cm, more preferably at least 4 N/cm, on a substrate having a surface energy less than or equal to 40 mN/m, and notably a polyolefin type plastic substrate such as HDPE and PP.

In particular, the adhesive composition according to the invention also makes it possible to manufacture self-adhesive articles capable of bonding rapidly and permanently to such surfaces.

In particular, the adhesive composition according to the invention is easy to use and also makes it possible to manufacture self-adhesive articles on high-speed production lines.

In the present application, the term low surface energy substrate means a substrate comprising at least one surface with a surface energy of less than or equal to 40 millinewtons per meter (mN/m) or millijoules per square meter (mJ/m$^2$), measured at 23° C. at 50% relative humidity, under atmospheric pressure of 1 bar, in air. The surface energy of a substrate can be quantified in a manner that is well known to the person skilled in the art, from the measurement of the contact angle and calculated according to the Owens & Wendt model.

Low surface energy substrates to which the adhesive according to the invention is intended to be applied preferably have a surface energy ranging from 23 to 38 mN/m (or mJ/m$^2$), and more preferentially from 25 to 35 mN/m.

SUMMARY OF THE INVENTION

The present invention thus relates firstly to an adhesive composition comprising:

A1) at least 4% by weight of one or more polysilylated polymers with a number-average molecular mass (Mn) of at least 6000 g/mol, chosen among polymers comprising a main polyether and/or polyurethane chain and at least two hydrolysable silylated end groups, said silylated end groups being attached to the main polymer chain by a urethane or ether function ("connecting group"), and A2) at least 13% by weight of one or more monosilylated polymers with an average molecular weight (Mn) of at least 1000 g/mol, chosen among polymers comprising a main polyether and/or polyurethane chain and a hydrolysable silylated end group, said silylated end group being attached to the main polymer chain by a urethane or ether function ("connecting group"); and B) at least 25% by weight of one or more tackifying resin(s) (each) comprising a hydroxyl index of less than or equal to 100, preferably less than or equal to 50, and more preferably equal to zero;

C) at least 0.2% of a crosslinking catalyst, the contents in % by weight being expressed relative to the total weight of the adhesive composition, and the sum of the contents of all the ingredients of the adhesive compositions being 100%.

According to one embodiment, the polysilylated polymers(s) A.1) correspond(s) to formula (I) or (II), as defined below, or a mixture thereof, and preferably corresponds to formula (II).

According to one embodiment, the monosilylated polymers(s) A.2) correspond(s) to formula (Ibis) or (IIbis), as defined below, or a mixture thereof, and preferably corresponds to formula (IIbis).

According to a more preferred embodiment, the polysilylated polymers(s) A.1) correspond(s) to formula (II), and the monosilylated polymer(s) A.2) correspond(s) to formula (IIbis).

According to one embodiment, the connecting group is a urethane group.

According to one embodiment, the polysilylated polymer(s) A.1) has (have) a number-average molecular mass (Mn) of from 6000 to 55,000 g/mol, preferably from 15,000 to 50,000 g/mol, and more preferably from 25,000 to 45,000 g/mol.

According to one embodiment, the monosilylated polymer(s) A.2) has (have) a number-average molecular mass (Mn) of from 1000 to 55,000 g/mol, preferably from 2,000 to 45,000 g/mol, and more preferably from 3,000 to 35,000 g/mol.

According to one embodiment, the tackifying resin(s) has (each have) a hydroxyl index substantially close to zero, and preferably equal to zero.

According to one embodiment, the tackifying resin(s) has (each have) a softening point ranging from 0° C. to 140° C., more preferably from 50° C. to 130° C., and more preferably between 70° C. and 120° C.

According to one embodiment, the tackifying resin(s) has (have) a number-average molecular mass ranging from 100 to 6000 g/mol, and preferably from 300 to 4000 g/mol.

According to one embodiment, the tackifying resin(s) is (are) chosen among:

(i) resins obtained by polymerization or copolymerization, optionally by hydrogenation, of mixtures of unsaturated aliphatic and/or aromatic hydrocarbons comprising approximately 5, 9 or 10 carbon atoms derived from petroleum fractions;

(ii) resins obtained by a process comprising the polymerization of alpha methyl styrene or copolymerization of alpha methyl styrene with other hydrocarbon monomers;

(iii) rosins of natural origin or modified rosins, for instance the rosin extracted from pine gum, wood rosin extracted from tree roots and derivatives thereof which are hydrogenated, dimerized, polymerized or esterified with monoalcohols or polyalcohols, such as glycerol or pentaerythritol; and (iv) mixtures thereof.

According to one embodiment, the adhesive composition according to the invention comprises:

A.1) from 5 to 59.8% by weight of one or more polysilylated polymers such as those defined above;

A.2) from 15 to 69.8% by weight of one or more monosilylated polymers such as those defined above;

B) from 25 to 79.8% by weight of one or more tackifying resins such as those defined above; and C) from 0.2 to 4% of a crosslinking catalyst, the contents in % by weight being expressed relative to the total weight of the adhesive composition, and the sum of the contents of all the ingredients of the adhesive compositions being equal to 100%.

The present invention secondly relates to a self-adhesive article comprising a support layer coated with a self-adhesive layer, said self-adhesive layer comprising an adhesive composition according to the invention in the crosslinked state.

According to one embodiment, the self-adhesive article is a self-adhesive multi-layer system, in particular a label or self-adhesive tape.

The present invention thirdly relates to a product to the surface of which has been affixed a self-adhesive article according to the invention, said surface preferably having a surface energy less than or equal to 40 mN/m, preferably ranging from 23 to 38 mN/m, more preferably from 25 to 35 mN/m, said surface energy being measured at 23° C., 50% relative humidity, atmospheric pressure of 1 bar, in air.

According to one embodiment, the surface of the product to which a self-adhesive article according to the invention has been affixed is based on plastic, preferably polyolefin, such as polyisoprene (PI), polyisobutylene (PIB), polyethylene (PE), polypropylene (PP) and copolymers thereof, and in particular HDPE and PP.

The surface of the product to which a self-adhesive article according to the invention has been affixed can also be based on cyclic olefin polymer(s) such as those obtained by ring-opening metathesis polymerization (ROMP).

The use of at least one monosilylated polymer used according to the invention in an adhesive composition comprising at least one polysilylated polymer, at least one tackifying resin and at least one crosslinking catalyst, preferably as described in the present application, results, after crosslinking, in an adhesive with an adhesive strength measured according to the peel test at 1800 (performed according to FINAT standard No. 1) of at least 3 N/cm on a low surface energy substrate, especially a plastic-based one as specified above, such as PE and PP.

In particular, the use of at least one monosilylated polymer used according to the invention in an adhesive composition comprising at least one polysilylated polymer, at least one tackifying resin and at least one crosslinking catalyst, preferably as described in the present application, makes it possible to obtain, after crosslinking, an adhesive with an adhesive strength measured according to the peel test at 1800 (performed according to FINAT standard No. 1) of at least 4 N/cm on PP.

DETAILED DESCRIPTION OF THE EMBODIMENTS OF THE INVENTION

In the present patent application, unless otherwise indicated:
the viscosity was measured at 23° C. using a Brookfield RTV viscometer, with a needle and a rotational speed suited to the sensor sensitivity, the average molecular weight of the tackifying resins (expressed in g/mole or Daltons) can be determined by methods well known to the person skilled in the art, for example by gel permeation chromatography (GPC), using for example a polystyrene standard, the average molecular weight of the silylated polymers (expressed in g/mole or Daltons) can be determined by methods well known to the person skilled in the art, for example by NMR 1H/13C and/or by calculation based on the molar quantities of the reagents used and/or by gel permeation chromatography (GPC), using for example a polystyrene standard, the hydroxyl index is the number of hydroxyl functions per gram of tackifying resin and is expressed in the present application as the equivalent number of milligrams of potassium per gram of tackifying resin (mg KOH/g) for the assay of the hydroxyl functions, the surface energy of a material or substrate was measured at 23° C., 50% relative humidity, atmospheric pressure of 1 bar, in air, the adhesion strength (or peel strength) was measured by a peel test at 1800 as described in the examples. The reference test is FINAT standard No. 1, the exposure time of the item on the carrier to be tested is 20 minutes, and the grammage of the deposited adhesive is 50 g/m$^2$.

the polysilylated polymer A1) is a polymer as described below having at least two hydrolysable silyl groups, the monosilylated polymer A2) is a polymer as described below having a single hydrolysable silyl group, "less" or "greater" not followed by the word "or equal" means "strictly less than" and "strictly greater than" respectively, the various embodiments described herein can be used alone or can be combined.

Adhesive Composition
Polysilylated Polymer A.1)

The adhesive composition according to the invention comprises at least one polysilylated polymer A1) (each) having a number-average molecular mass (Mn) of at least 6000 g/mol, chosen among polymers comprising a main polyether and/or polyurethane chain and at least two hydrolysable silylated end groups, said silylated end groups being attached to the main polymer chain by a urethane or ether function.

According to a first embodiment of the polysilylated polymer A. 1) the polysilylated polymer A.1) is of a polyether type comprising least two ends, each connected to a hydrolysable silylated end group by an ether function. According to this embodiment, the polysilylated polymer A. 1) can be obtained by a preparation method comprising:
  in a first step, the preparation of a polyether with at least two allyl ether end groups (—O—CH$_2$—CH$_2$EC); then
  in a second step, reacting said polyether obtained at the end of the first step with at least one silane having an SiH group, in a sufficient amount to react each of the —O—CH$_2$—CH=CH$_2$ end groups of the polyether with the SiH group of the silane by hydrosilylation in the presence of a platinum catalyst; the number-average molecular mass (Mn) of the polyether obtained after the first step must be sufficiently high to obtain, after reaction with the silane compound, a polysilylated polymer A. 1) of the desired Mn.

According to a second embodiment of the polysilylated polymer A.1) the polysilylated polymer A.1) is of a polyurethane type comprising least two ends, each connected to a hydrolysable silylated end group by a urethane function. According to this embodiment, the polysilylated polymer A.1) can be obtained by a preparation method comprising:
  in a first step, the preparation of a polyurethane having at least two OH end groups; then
  in a second step, reacting said polyurethane with at least one isocyanatosilane having an NCO group, in a sufficient amount to make each of the OH end groups of the polyurethane react with the NCO group of an isocyanatosilane; the number-average molecular mass (Mn) of the polyurethane obtained after the first step must be sufficiently high to obtain, after reaction with the isocyanatosilane compound, a polysilylated polymer A. 1) of the desired Mn.

Polyurethane with at least two OH end groups can be obtained in manner well known to the person skilled in the art, by polyaddition of a stoichiometric excess of at least one polyether polyol with at least one diisocyanate. Preferably, the polyether polyol is a polyether diol.

In the first step, it is also possible to mix in with the polyether polyol(s) at least one chain extender with two groups each chosen separately among OH and the primary and secondary amines. The chain extender is different from the polyether polyol(s) used for preparing the polyurethane and generally has a molecular mass of less than 300 g/mol.

The amounts of polyether polyol(s), diisocyanate(s), and as the case may be, of chain extender(s) used are adjusted in a manner well known to the person skilled in the art in order to obtain, at the end of the first step, a polyurethane with two OH end groups, these quantities moreover being such that the molar ratio of the number of NCO functional groups to the total number of OH functional groups to which is added the primary and secondary amine functions that may be present (denoted r2.1) is strictly less than 1.

The amount of isocyanatosilane used is adjusted in a manner well known to the person skilled in the art in order to obtain, at the end of the second step, a polysilylated polymer A. 1), this quantity moreover being such that the molar ratio of the number of NCO functional groups to the total number of OH functional groups, primary and secondary amine functions possibly being present (denoted r2.2) is close to 1, i.e. between 0.95 and 1.05.

Preparation of polysilylated polymer A.1) is preferably carried out in the presence of at least one reaction catalyst. In particular, it is possible to use any catalyst capable of accelerating the rate of the reaction and/or reactions described above and taking place in the first step and/or the second step of the preparation process described above.

According to a third embodiment of the polysilylated polymer A. 1) the polysilylated polymer A.1) is of a polyether type comprising least two ends, each connected to a hydrolysable silylated end group by a urethane function. According to this embodiment, the polysilylated polymer A1) can be obtained by reacting at least one polyether polyol with at least one isocyanatosilane having an NCO group, in a sufficient amount to react each of the OH end groups of the polyether polyol with the NCO group of an isocyanatosilane; the number-average molecular mass (Mn) of the polyether polyol used must be sufficiently high to obtain, after reaction with the isocyanatosilane, a polysilylated polymer A.1) of the desired Mn.

It is also possible to mix in with the polyether polyol(s) at least one chain extender as described above.

The amount of isocyanatosilane used is adjusted in a manner well known to the person skilled in the art in order to obtain a polysilylated polymer A.1), this quantity being such that the molar ratio of the number of NCO functional groups to the total number of OH functional groups, primary and secondary amine functions possibly being present (denoted r3) is close to 1, i.e. between 0.95 and 1.05.

Preparation of polysilylated polymer A.1) is preferably carried out in the presence of at least one reaction catalyst. In particular, it is possible to use any catalyst capable of accelerating the rate of the reaction taking place in the preparation process described above.

Preferably, the polysilylated polymer(s) A. 1) correspond(s) to one of the following formulas, or a mixture thereof:

formula (I):

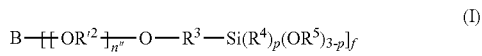

wherein:
- B represents a divalent (for f=2) or trivalent (for f=3) linear, branched, cyclic, alicyclic or aromatic, saturated or unsaturated hydrocarbon radical containing from 2 to 66 carbon atoms, optionally comprising one or more heteroatoms, such as O, N,
- $R^3$ represents a linear or branched divalent alkylene radical comprising from 1 to 6 carbon atoms;
- $R'^2$ represents a linear or branched divalent alkylene radical comprising from 2 to 4 carbon atoms;
- $R^4$ and $R^5$, identical or different, each represent a linear or branched alkyl radical comprising 1 to 4 carbon atoms; $R^4$ can optionally be engaged in a ring; preferably $R^4$ is a methyl group;
- n" is a non-zero integer such that the number-average molecular mass of the polyether block of formula $-[OR'^2]_{n''}-$ ranges from 150 g/mol to 20,000 g/mol;
- p is an integer equal to 0 or 1;
- f is an integer equal to 2 or 3;
- the indices n" and f are such that the number-average molecular mass of the polymer A.1) is at least 6000 g/mol;

formula (II):

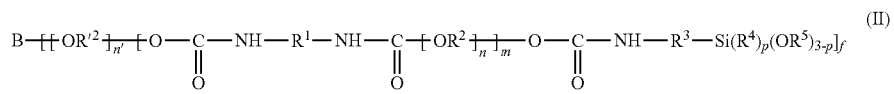

wherein:
- B represents a divalent (for f=2) or trivalent (for f=3), linear, branched, cyclic, alicyclic or aromatic, saturated or unsaturated hydrocarbon radical containing from 2 to 66 carbon atoms, optionally comprising one or more heteroatoms, such as O, N,
- $R^1$ represents a divalent hydrocarbon radical comprising from 5 to 15 carbon atoms which can be aliphatic or aromatic, linear, branched or cyclic;
- $R^3$ represents a linear or branched divalent alkylene radical comprising from 1 to 6 carbon atoms;
- $R^2$ and $R'^2$, identical or different, each represent a linear or branched divalent alkylene radical comprising from 2 to 4 carbon atoms;
- $R^4$ and $R^5$, identical or different, each represent a linear or branched alkyl radical comprising 1 to 4 carbon atoms; $R^4$ can optionally be engaged in a ring; preferably $R^4$ is a methyl group;
- n is a non-zero integer such that the number-average molecular mass of the polyether block of formula $-[OR^2]_n-$ ranges from 300 g/mol to 40,000 g/mol;
- n' is a zero or non-zero integer such that the number-average molecular mass of the polyether block of formula $-[OR'^2]_{n'}-$ ranges from 0 g/mol to 20,000 g/mol;
- m is a zero or non-zero integer;
- p is an integer equal to 0 or 1;
- f is an integer equal to 2 or 3;
- the indices m, n, n' and f are such that the number-average molecular mass of the polymer A.1) is at least 6000 g/mol;

In formulae (I) and/or (II), preferably:
$R^2$ and/or $R'^2$, identical or different, each represent a linear or branched divalent propylene radical, such as a divalent isopropylene radical;

n is a integer such that the number-average molecular mass of the polyether block of formula $-[OR^2]_n-$ ranges from 6000 g/mol to 25,000 g/mol;

n' is an integer such that the number-average molecular mass of the polyether block of formula $-[OR'^2]_n-$ ranges from 0 g/mol to 12,500 g/mol.

More preferentially,
$R^2$ and/or $R'^2$, identical, each represent a divalent isopropylene radical;

n is a integer such that the number-average molecular mass of the polyether block of formula $-[OR^2]_n-$ ranges from 8000 g/mol to 20,000 g/mol; and n' is an integer such that the number-average molecular mass of the polyether block of formula $-[OR'^2]_n-$ ranges from 0 g/mol to 10,000 g/mol.

Preferably, $R^3$ represents a linear or branched divalent alkylene radical comprising from 1 to 3 carbon atoms, and more preferentially a divalent methylene or n-propylene radical.

Preferably, $R^4$ represents a methyl radical, when p is equal to 1.

Preferably, $R^5$ represents a methyl or ethyl radical.

According to one embodiment, the adhesive composition comprises a blend of polysilylated polymer(s) A.1) of formula (I) and/or (II). Preferably, the adhesive composition comprises a blend of polysilylated polymers (s) A.1) comprising at least one polysilylated polymer of formula (I) or (II) such that p=0, and at least one polysilylated polymer of formula (I) or (II) such that p=1. More preferentially, the adhesive composition comprises a blend of polysilylated polymers (s) A.1) comprising at least one polysilylated polymer of formula (II) such that p=0, and at least one polysilylated polymer of formula (II) such that p=1.

Preferably, the silylated polymer(s) A. 1) is (are) disilylated.

Preferably, the silylated polymer(s) A. 1) correspond(s) to formula (II).

According to a preferred embodiment, the polysilylated polymer(s) A1) is a (are) disilylated polymer(s) corresponding to formula (II) wherein f=2 and m is not zero. It was found that the use of a disilylated polymer A.1) of formula (II) according to this embodiment resulted in improved adhesive performance, in particular on PE and PP.

According to a yet more preferred embodiment, the polysilylated polymer(s) A1) is a (are) disilylated polymer(s)

corresponding to formula (II) wherein f=2, m is not zero, and p=1. In particular, it was found that the use of a disilylated polymer A.1) of formula (II) according to this embodiment resulted in improved adhesive performance, in particular on PP.

Preferably, the polysilylated polymer(s) A.1) has (have) a number-average molecular mass (Mn) of from 6000 to 55,000 g/mol, more preferably from 15,000 to 50,000 g/mol, and yet more preferably from 25,000 to 45,000 g/mol. The indices of formulas (I) and (II) given above are preferably such that the number-average molecular mass (Mn) of the polysilylated polymers(s) A. 1) vary within these ranges of values.

In particular, it was observed that the use of a disilylated polymer A. 1) of higher Mn in the mixture of polymers A.1) and A.2) leads to improved adhesive performance on PE and PP, for polymers of the same type.

The content of polysilylated polymers(s) A1) is at least 4% by weight of the weight of the adhesive composition according to the invention; preferably, it is from 5 to 59.8% by weight, more preferably from 15 to 54.8% by weight, and yet more preferably from 20 to 44.8% by weight, for the total weight of the adhesive composition.

Monosilylated Polymer A.2)

The adhesive composition according to the invention comprises at least one monosilylated polymer A.2) having a number-average molecular mass (Mn) of at least 1000 g/mol, chosen among polymers comprising a main polyether and/or polyurethane chain and a hydrolysable silylated end group, said silylated end group being attached to the main polymer chain by a urethane or ether function ("connector group").

According to a first embodiment of the monosilylated polymer A.2) the monosilylated polymer A.2) is of a polyether type wherein one of the two ends is connected to a hydrolysable silylated end group by an ether function.

According to this embodiment, the monosilylated polymer A.2) can be obtained by a preparation method comprising:

in a first step, the preparation of an alkyl (poly)ether group having an allyl ether end group of structure (IIIa):

wherein:

$R^0$ represents a divalent hydrocarbon radical comprising from 1 to 60 carbon atoms, which can be aliphatic, aromatic or alkyl aromatic, linear, branched or cyclic;

n''' is a zero or non-zero integer such that the number-average molecular mass of the polyether block of formula $-[OR'^2]_{n'''}-$ ranges from 0 g/mol to 20,000 g/mol; and $R'^2$ is the same as before;

in a second step, reacting said compound of formula (IIIa) with at least one silane having an SiH group, in a sufficient amount to react each of the $-O-CH_2-CH=CH_2$ end groups of the polyether monoallylether with the SiH group of a silane by hydrosilylation; the number-average molecular mass (Mn) of the polyether monoallylether obtained after the first step must be sufficiently high to obtain, after reaction with the silane compound, a monosilylated polymer A.2) of the desired Mn.

According to a second embodiment of the monosilylated polymer A.2) the monosilylated polymer A.2) is a polyurethane wherein one of the two ends is connected to a hydrolysable silylated end group by a urethane function.

According to this embodiment, the monosilylated polymer A.2) can be obtained in-situ during the synthesis of the polysilylated polymer A.1) by a preparation method comprising:

in a first step, preparing a mixture comprising a polyurethane having a single OH end group and a polyurethane comprising two OH end groups; then in a second step, reacting said polyurethane mixture obtained in the first step with at least one isocyanatosilane having an NCO group, in a sufficient amount to react all of the OH end groups of the polyurethane mixture with the NCO group of an isocyanatosilane; the number-average molecular mass (Mn) of the polyurethane obtained after the first step must be sufficiently high to obtain, after reaction with the silane compound, polysilylated polymers A.1) and the monosilylated A.2), of the desired Mn.

The polyurethane mixture having respectively two OH end groups and a single OH end group can be obtained in manner well known to the person skilled in the art, by polyaddition of a stoichiometric excess of a mixture of polyether diol and monol with at least one diisocyanate.

Polyether diol(s) and diisocyanate(s) that can be used to prepare the polyurethane comprising two OH end groups can be selected among those described in the second embodiment of the polysilylated polymer A. 1).

Monol(s) that can be used for the in-situ synthesis of the polyurethane comprising a single OH end group can be selected among the compounds of structure (IIIb) below:

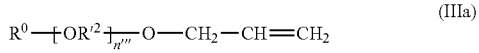

(IIIb)

to obtain a polyurethane comprising a single OH end group of sufficient number-average molecular mass. In formula (IIIb), $R^0$ and $R'^2$ are as defined in formula (IIIa), n''' is a zero or non-zero integer such that the number-average molecular weight of the polyether block of formula $-[OR'^2]_{n'''}-$ ranges from 0 g/mol to 20,000 g/mol.

The chain extender can be added in the first step in a mixture with the polyether diol(s) and the monol(s).

The chain extender can be selected from those described in the first embodiment.

The amounts of polyether diol(s), monol(s), and as the case may be, of chain extender(s) used are adjusted in a manner well known to the person skilled in the art in order to obtain, at the end of the first step, a mixture comprising a polyurethane with a single OH end group and a polyurethane with two OH end groups, these quantities moreover being such that the molar ratio of the number of NCO functional groups to the total number of OH functional groups to which is added the primary and secondary amine functions that may be present (denoted r2.1) is strictly less than 1.

The amount of isocyanatosilane used is adjusted in a manner well known to the person skilled in the art in order to obtain, at the end of the second step, a mixture of polysilylated polymer A. 1) and monosilylated polymer A.2), this quantity being such that the molar ratio of the number of NCO functional groups to the total number of OH functional groups, primary and secondary amine functions possibly being present (denoted r2.2) is close to 1, i.e. between 0.95 and 1.05.

Preparation of the mixture of polysilylated polymer A.1) and monosilylated polymer A.2) is preferably carried out in the presence of at least one reaction catalyst. In particular, it is possible to use any catalyst capable of accelerating the rate of the reaction and/or reactions described above and taking place in the first step and/or the second step of the preparation process described above.

According to a third embodiment of the monosilylated polymer A.2) the monosilylated polymer A.2) is a polyether wherein one of the two ends is connected to a hydrolysable silylated end group by a urethane function. According to this embodiment, the monosilylated polymer A.2) can be obtained by reacting at least one compound of structure (IIIb), as defined below:

$$R^0-[OR'^2]_{n'''}-OH \quad (IIIb)$$

with at least one isocyanatosilane having an NCO group in an amount sufficient to react each OH group of the compound (IIIb) with the NCO group of an isocyanatosilane, the number-average molecular mass of the polyether monol used being chosen so as to obtain a monosilylated polymer A.2) of the desired Mn. In formula (IIIb), $R^0$ and $R'^2$ are as defined in formula (IIIa), n''' is a zero or non-zero integer such that the number-average molecular weight of the polyether block of formula $-[OR'^2]_{n'''}-$ ranges from 0 g/mol to 20,000 g/mol.

The amount of isocyanatosilane used is adjusted in a manner well known to the person skilled in the art in order to obtain a monosilylated polymer A.2), this quantity being such that the molar ratio of the number of NCO functional groups to the total number of OH functional groups, primary and secondary amine functions possibly being present (denoted r2.2) is close to 1, i.e. between 0.95 and 1.05.

Preparation of the mixture of polysilylated polymer A.1) and monosilylated polymer A.2) is preferably carried out in the presence of at least one reaction catalyst. In particular, it is possible to use any catalyst capable of accelerating the rate of the reaction and/or reactions described above and taking place in the first step and/or the second step of the preparation process described above.

Preferably, the monosilylated polymer(s) A.2) correspond(s) to one of the following formulas, or a mixture thereof:

formula (Ibis):

$$R^0-[OR'^2]_{n'''}-O-R^3-Si(R^4)_p(OR^5)_{3-p} \quad (Ibis)$$

wherein:
$R^0$ represents a divalent hydrocarbon radical comprising from 1 to 60 carbon atoms, which can be aliphatic, aromatic or alkyl aromatic, linear, branched or cyclic;

$R^3$ represents a linear or branched divalent alkylene radical comprising from 1 to 6 carbon atoms;

$R'^2$ represents a linear or branched divalent alkylene radical comprising from 2 to 4 carbon atoms;

$R^4$ and $R^5$, identical or different, each represent a linear or branched alkyl radical comprising 1 to 4 carbon atoms; $R^4$ can optionally be engaged in a ring; preferably $R^4$ is a methyl group;

n''' is a zero or non-zero integer such that the number-average molecular mass of the polyether block of formula $-[OR'^2]_{n'''}-$ ranges from 0 g/mol to 20,000 g/mol;

p is an integer equal to 0, 1 or 2.

$R^0$ and n''' are such that the number-average molecular mass of the polymer A.2) is at least 1000 g/mol;

formula (IIbis):

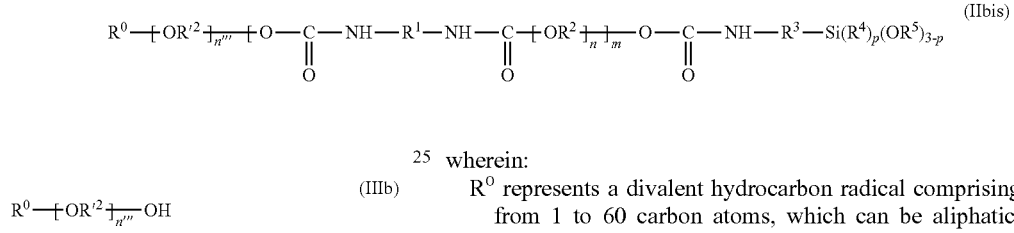

wherein:
$R^0$ represents a divalent hydrocarbon radical comprising from 1 to 60 carbon atoms, which can be aliphatic, aromatic or alkyl aromatic, linear, branched or cyclic;

$R^1$ represents a divalent hydrocarbon radical comprising from 5 to 15 carbon atoms, which can be aliphatic or aromatic, linear, branched or cyclic;

$R^3$ represents a linear or branched divalent alkylene radical comprising from 1 to 6 carbon atoms;

$R^2$ and $R'^2$, identical or different, each represent a linear or branched divalent alkylene radical comprising from 2 to 4 carbon atoms;

$R^4$ and $R^5$, identical or different, each represent a linear or branched alkyl radical comprising from 1 to 4 carbon atoms; $R^4$ can optionally be engaged in a ring; preferably $R^4$ is a methyl group;

n is an integer such that the number-average molecular mass of the polyether block of formula $-[OR^2]_n-$ ranges from 300 g/mol to 40,000 g/mol;

n''' is a zero or non-zero integer such that the number-average molecular mass of the polyether block of formula $-[OR'^2]_{n'''}-$ ranges from 0 g/mol to 20,000 g/mol;

m is a zero or non-zero integer;

p is an integer equal to 0, 1 or 2.

$R^0$ and the indices m, n, and n''' are such that the number-average molecular mass of the polymer A.2) is at least 1000 g/mol;

Preferably, p is an integer equal to 0 or 1; More preferably, p is equal to 1.

Preferably, the monosilylated polymer(s) A.2) correspond(s) to formula (IIbis).

Preferably, the monosilylated polymer(s) A.2) correspond(s) to formula (IIbis) wherein p=1.

Preferably, the monosilylated polymer(s) A.2) has (have) a number-average molecular mass (Mn) of from 1000 to 55,000 g/mol, preferably 2,000 to 45,000 g/mol, and more preferably from 3,000 to 35,000 g/mol. $R^0$ and the indices of formulas (Ibis) and (IIbis) given above are preferably such that the number-average molecular mass (Mn) of the monosilylated polymers(s) A.2) vary within these ranges of values.

The content of monosilylated polymers(s) A2) is at least 13% by weight of the total weight of the adhesive composition according to the invention; preferably, it is from 15 to 69.8% by weight, more preferably from 15 to 54.8% by weight, and yet more preferably from 20 to 44.8% by weight, for the total weight of the adhesive composition.

In particular, it was observed that the use of a larger content in monosilylated polymer A.2) in the mixture of polymers A.1) and A.2) leads to improved adhesive performance on PE and PP.

For alternative blends of polysilylated polymer A.1) and monosilylated A.2) as described above, the mixture of polymers of formula (II) and (IIbis) are preferred.

The adhesive compositions according to these alternatives lead to better adhesion performance on polyolefin type substrates such as PE and PP, in particular on HDPE and PP, and more particularly on PP.

The adhesion strength measured by peel test at 1800 (in accordance with FINAT standard No. 1) of the adhesive compositions according to these alternatives is greater than or equal to 3 N/cm, more preferably greater than or equal to 3.5 N/cm and yet more preferably greater than or equal to 4 N/cm, on PE and in particular on HDPE.

The adhesion strength measured by peel test at 1800 (in accordance with FINAT standard No. 1) of the adhesive compositions according to these alternatives is greater than or equal to 4 N/cm, or preferably to 5 N/cm, more preferably greater than 6 N/cm, and yet more preferably greater than or equal to 7 N/cm, on PP.

The preparation methods described above for polysilylated polymers A.1 and monosilylated polymers A.2 were performed in anhydrous conditions, in order to avoid hydrolysis of the hydrolysable silyl groups. Likewise, the use of these polymers is preferably carried out under such conditions.

Tackifying Resin B)

The tackifying resin(s) B) used in the adhesive composition according to the invention are compatible with the polysilylated polymer A.1) and the monosilylated polymer A.2).

"Compatible tackifying resin" means a tackifying resin which, when mixed in the proportion of 50/50% by weight with the polysilylated polymer A. 1) and the monosilylated polymer A.2), results in a substantially homogeneous blend.

The tackifying resin(s) B) (each) preferably have a hydroxyl index of less than or equal to 50 or, more preferably substantially close to zero, and yet more preferably zero.

Preferably, the tackifying resin(s) B) has (each have) a softening point ranging from 0° C. to 140° C., more preferably from 50° C. to 130° C., and more preferably between 70° C. and 120° C.

Preferably, the tackifying resin(s) B) has (have) a number-average molecular mass ranging from 100 to 6000 g/mol, and preferably 300 to 4000 g/mol.

Preferably, the tackifying resin(s) is (are) chosen (s) from:
(i) resins obtained by polymerization or copolymerization, optionally by hydrogenation, of mixtures of unsaturated aliphatic and/or aromatic hydrocarbons comprising approximately 5, 9 or 10 carbon atoms derived from petroleum fractions;
(ii) resins obtained by a process comprising the polymerization of alpha methyl styrene or copolymerization of alpha methyl styrene with other hydrocarbon monomers;
(iii) rosins of natural origin or modified rosins, for instance the rosin extracted from pine gum, wood rosin extracted from tree roots and derivatives thereof which are hydrogenated, dimerized, polymerized or esterified with monoalcohols or polyalcohols, such as glycerol or pentaerythritol; and
(iv) mixtures thereof.

According to a preferred embodiment, the tackifying resin B) is a tackifying resin of type (i) or a mixture of tackifying resins comprising at least one tackifying resin of type (i) and/or (ii). Yet more preferably, the tackifying resin B) a mixture of tackifying resins comprising at least one tackifying resin of type (i) and (ii). In particular, it was found that using a mixture of tackifying resins comprising at least one type (i) resin, preferably a mixture comprising at least one resin of types (i) and (ii), according to this embodiment, resulted in improved adhesive performance, particularly, at least, on PP.

Such resins are commercially available. These include for example the following products:
- type (i) resins: PICCO®-AR-100 (available from Eastman) which is obtained by polymerisation of aromatic hydrocarbon mixtures predominantly comprising 9 carbon atoms derived from petroleum fractions, with OHI zero, a number-average molecular mass of 600 g/mol and a softening point of 100° C.; or PICCO® AR-85 (available from Eastman) which is obtained by polymerisation of aromatic hydrocarbons mixtures predominantly comprising 9 carbon atoms derived from petroleum fractions, with OHI zero, a number-average molecular mass of 520 g/mol and a softening point of 85° C.; NORSOLENE® M1090 (available from Cray Valley) which is a modified aromatic aliphatic resin with OHI zero and a softening point of 90° C.; or PICCO® A-10 (available from Eastman) with a number-average molecular mass of 420 g/mol and liquid at room temperature;
- type (ii) resins: NORSOLENE® W110 (available from Cray Valley), which is obtained by polymerising alpha methyl styrene without the action of phenols, with OHI zero, a number-average molecular mass of 750 g/mol and a softening point of 110° C.; NORSOLENE® W85 (available from Cray Valley) which is an alpha methyl styrene resin with OHI zero, a number-average molecular mass of 600 g/mol and a softening point of about 85° C.;
- type (iii) resins: Sylvalite® RE 100 (available from Arizona Chemical) which is a rosin and pentaerythritol ester with an OHI of 50 mg KOH/g, a number-average molecular mass of 974 g/mol, and a softening point of 100° C.

The content of the tackifying resin B) is at least 25% by weight of the weight of total weight of the adhesive composition according to the invention; preferably, it is from 25 to 79.8% by weight, more preferably from 30 to 69.8% by weight, and yet more preferably from 35 to 59.8% by weight, for the total weight of the adhesive composition.

Crosslinking Catalyst

Crosslinking catalyst(s) that can be used in the composition according to the invention can be any catalyst known to the person skilled in the art for the condensation of silanol. Examples of such catalysts include organic titanium derivatives such as titanium acetyl acetonate (commercially available under the name TYZOR® AA75 from DuPont), aluminium such as aluminium chelate (commercially available under the name K-KAT® 5218 from KING INDUSTRIES), or amines such as 1,8-diazabicyclo (5.4.0) undecene-7 or DBU.

The crosslinking catalyst content C) ranges from 0.2 to 4% by weight for the total weight of the adhesive composition.

According to one embodiment, the adhesive composition according to the invention comprises:
- at least 5% by weight of one or more polysilylated polymers A.1);
- at least 15% by weight of one or more monosilylated polymers A.2);
- from 25 to 79.8% by weight of one or more tackifying resins B); and
- C) from 0.2 to 4% by weight of at least one crosslinking catalyst, with the content in silylated polymers A. 1) and A.2) representing from 20 to 74.8% by weight for the total weight of the adhesive composition.

In one yet more preferred embodiment, the composition according to the invention comprises:
- at least 15% by weight of one or more disilylated polymers A.1);
- at least 15% by weight of one or more monosilylated polymers A.2);
- from 30 to 69.8% by weight of one or more tackifying resins B); and
- C) from 0.2 to 4% by weight of at least one crosslinking catalyst, with the content in silylated polymers A. 1) and A.2) representing from 30 to 69.8% by weight for the total weight of the adhesive composition.

In one yet more preferred embodiment, the adhesive composition according to the invention comprises:
- at least 20% by weight of one or more disilylated polymers A.1);
- at least 20% by weight of one or more monosilylated polymers A.2);
- from 35 to 59.8% by weight of one or more tackifying resins B); and
- C) from 0.2 to 4% by weight of at least one crosslinking catalyst, with the content in silylated polymers A. 1) and A.2) representing from 40 to 64.8% by weight for the total weight of the adhesive composition.

The adhesive composition according to the invention may or may not include, in combination with the blend of polysilylated A.1) and monosilylated A.2) polymers, at least one thermoplastic polymer chosen from those used in the preparation of HMPSAs, such as ethylene vinyl acetate (EVA), or styrene block copolymers (such as SIS, SBS, SIBS, SEBS, SEPS and their derivatives including graft maleic anhydride). These thermoplastic polymers are not silylated.

The adhesive composition according to the invention may or may not also comprise at least one non-polymeric hydrolysable alkoxysilane derivative with a molar mass of less than 500 g/mol, as a desiccant, and preferably a derivative of trimethoxysilane. Such an agent advantageously prolongs the shelf life of the adhesive composition according to the invention during storage and transport prior to use. Such agents include, for example gamma-methacryloxypropyltrimethoxysilane available under the trade name SILQUEST® A-174 from the Momentive company. The content in desiccant can be up to 3% by weight for the weight of the adhesive composition.

The composition according to the invention may or may not also include at least one plasticizer such as a phthalate or a benzoate, a paraffinic and naphthenic oil (such as Primol® 352 from ESSO) or a homopolymer of polyethylene wax (such as A-C® 617 by HONEYWELL), or a wax of a copolymer of polyethylene and vinyl acetate, or pigments or dyes, or a mixture of these compounds.

The adhesive composition according to the invention may or may not include fillers. The filler content is preferably less than 15% by weight, more preferably less than 10% by weight, and yet more preferably less than 1% by weight, of the weight of the adhesive composition.

Lastly, 0.1 to 2% of one or more stabilizers (or antioxidants) are preferably included in the adhesive composition according to the invention. These compounds are added to protect the composition against degradation resulting from a reaction with oxygen which is subject to being formed by the action of heat or light. These compounds can include primary antioxidants, which trap free radicals and which are generally substituted phenols, such as Irganox® 1076 from Ciba. Primary antioxidants can be used alone or in combination with other secondary antioxidants or UV stabilizers.

The adhesive composition according to the invention can be prepared by a process which comprises:
- a mixing step performed under airtight conditions, preferably in an inert or vacuum atmosphere, wherein polysilylated A.1) and monosilylated A.2) polymers are blended with the tackifying resins B) at a temperature ranging from 40 to 170° C., and preferably from 70 to 150° C.; then
- a step wherein at least one crosslinking catalyst C) and, where appropriate, at least one desiccant and one or more other optional components as previously described, is (are) incorporated into said mixture at a temperature ranging from 40 to 90° C.

The adhesive composition according to the invention can be used for the manufacture of a self-adhesive article comprising a temporary or permanent support layer and an adhesive layer, said adhesive layer being obtained by crosslinking the adhesive composition.

The support layer of self-adhesive article obtained from the adhesive composition according to the invention can be a temporary or permanent support layer.

In the case where the support layer is a temporary carrier, the support layer is preferably a plastic film or protective non-stick liner ("release liner"). In this case, once the item is affixed to a surface, the bonded item only comprises an adhesive layer, with the temporary support being designed to be removed.

"Non-stick" means a material on which the adhesive composition according to the invention in the crosslinked condition has an adhesive strength of less than 200 centinewtons per centimetre (cN/cm), preferably less than 50 cN/cm, yet more preferably less than 30 cN/cm or yet more preferably less than 10 cN/cm. This value is measured according to the FINAT 3 test conducted at a tensile speed of 300 mm/min and a pull angle of 180°.

The release liner generally has a surface energy not of less than 22 mN/m, more preferably less than 20 mN/m.

If the support layer is a permanent one, the support layer can be made from any materials that can be used to manufacture pressure-sensitive items or PSA items.

Self-Adhesive Article

The present invention also relates to a self-adhesive article comprising a support layer coated with a self-adhesive layer, said self-adhesive layer comprising an adhesive composition according to the invention in the crosslinked state.

Within the meaning of the present invention, the term "self-adhesive article" includes any article which can be glued onto a surface only by manual pressure or using equipment, without using additional glues or adhesives The term "self-adhesive article" also includes the term "pressure sensitive adhesive item" or "PSA item. These items are intended to be affixed to a surface to be bonded in order to close it up, support it, affix it, or simply immobilise it, or to display shapes, logos, pictures or information. These items can be used in many fields such as the medical, clothing, packaging, automotive and construction industries. They can be made according to their end use, for example in the form of tape such as industrial-use tapes or DIY tapes, or for attaching objects on worksites, as single or double-sided tape, or as labels, bandages, dressings, patches or graphic films.

According to one embodiment, the self-adhesive article is a self-adhesive multi-layer system, in particular a label or a self-adhesive tape, which can be single- or double-sided.

The support layer is sufficiently flexible to be wrapped and packaged in a roll, for example as described above.

Preferably, the support layer has an elongation at break greater than zero and strictly less than 100%. More preferably, the support layer has an elongation at break of less than or equal to 50% and yet more preferably less than or equal to 40%. Yet more preferably, the support layer has an elongation at break of less than or equal to 30%.

The elongation at break can be measured according to ISO 1926 at 23° C., in the direction of the length or width. Preferably, the elongation at break is measured in the direction of the length.

The support layer can be based, for example, on acrylic polymers, polyethylene (PE), polypropylene (PP), oriented, non-oriented or bi-oriented, polyimide, polyurethane, polyester such as polyethylene terephthalate (PET) or paper.

Preferably, the support layer has a Young's modulus strictly greater than 300 MPa, more preferably greater than or equal to 400 MPa, and yet more preferably greater than or equal to 500 MPa.

According to one embodiment, the self-adhesive article obtained from the adhesive composition according to the invention comprises a permanent support layer coated with an adhesive layer. Preferably, the adhesive layer is also endowed with a plastic film or release liner, preferably siliconized.

Alternatively the release liner, the rear face of the permanent support layer which is not coated with the adhesive layer, can have a non-stick surface, for example a protective silicone layer.

The two embodiments described above make it possible to roll up the self-adhesive article and then unroll it without any problem of transfer of the adhesive between the adhesive layer and the permanent support layer.

According to one embodiment, the permanent support layer is coated on both sides with an adhesive composition, which can be identical or different, with at least one of the two adhesive compositions being according to the invention.

Preferably, the support layer has a thickness ranging from 10 microns to 50 mm, and more preferably from 10 microns to 20 mm, preferably ranging from 20 microns to 10 mm, and more preferably from 20 microns to 1 mm.

In some cases, a surface treatment of the backing layer is necessary to enhance the bond of the adhesive layer when applying the coating thereto, particularly when the support layer and the surface of the substrate to be bonded have the same surface energy.

The self-adhesive article according to the invention can be affixed to the surface of a low surface energy substrate which has not been pre-treated. These pre-treatments are intended to modify chemically and/or physically said surface in order to increase the surface energy and/or the roughness of said surface and thus improve the adhesion of the adhesive layer to said surface. Examples of known surface treatments include plasma or corona treatments, abrasion, or coating the surface with a chemical adhesion agent (also known as a primer) that is capable enhancing the surface energy of the substrate to which it is applied.

The self-adhesive article according to the invention can thus bond two substrates, at least one of which is has a low surface energy.

The substrate to which the self-adhesive article is to be affixed (referred to as "substrate to be bonded") can be flexible or rigid.

In particular, it can have the same flexibility as the support layer described above, so that it can be rolled and packaged in the form of a roll, for example as described above.

Alternatively, the substrate to be bonded can be rigid. In this case, the substrate cannot be rolled up and packaged in the form of a roll, for example as described above, without weakening.

The substrate to be bonded can be selected from low surface energy substrates such as polyolefin substrates, which are organic nonpolar substrates, or organic polar coatings such as varnish, ink or paint, said substrates having a surface energy of less than 40 mN/m, preferably from 23 to 38 mN/m, and more preferably from 25 to 35 mN/m.

Polyolefin-type substrates can, for example, be polymeric materials based on monomers and co-monomers such as polyethylene (PE), polypropylene (PP), polyisoprene (PI), polyisobutylene (PIB) and their copolymers (blocks or random) or based on cyclic olefin polymer(s) such as those obtained by ring-opening metathesis polymerization (ROMP).

Examples of polyethylene (PE) include, in particular, high density polyethylene (HDPE), low density polyethylene (LDPE), linear low density polyethylene and linear ultra-low density polyethylene.

Due to the bonding properties of the adhesive obtained by crosslinking the adhesive composition according to the invention, the self-adhesive article according to the invention can bond a low energy surface substrate, in particular a plastic-based one, preferably with a polyolefin base such as PE and PP, in particular HDPE and PP, with an adhesive strength of at least 3 N/cm.

In particular, the self-adhesive article according to the invention can bond to a PP-based substrate with an adhesive strength of at least 4 N/cm.

According to one embodiment according to the invention, the self-adhesive article also comprises a protective release liner.

According to one embodiment, said release liner is applied to the adhesive layer, after crosslinking the adhesive composition.

The support layer can be covered on one of its two sides, the rear side which is not coated with the adhesive layer, protective release liner, e.g., a silicone film. In this way, the self-adhesive article can be rolled up on itself and then unrolled easily due to the lack of adhesion of the adhesive layer to the silicone side.

The self-adhesive article according to the invention can be obtained by the process comprising the following steps:
  (a) packaging of the adhesive composition according to the invention as defined above at a temperature ranging from 20 to 130° C.; then
  (b) coating a carrier surface with the adhesive composition obtained in step (a); then
  (c) crosslinking the coated adhesive composition by heating it to a temperature ranging from 20 to 200° C. in a gaseous environment comprising from 10 to 200 mg of water molecules per m$^3$ of gas;

(d) laminating or transferring the crosslinked adhesive layer onto a support layer or a non-stick release liner; said support layer or release liner can be the back side of the carrier surface.

"Carrier surface" as defined in the present invention should be understood to be either a carrier strip covered by a non-stick protective film, or a release liner, or a support layer. Thus, the carrier surface is intended to become part of the self-adhesive section, either as a release liner or as a support layer If the carrier surface is not a support layer, the method for producing the self-adhesive article according to the invention comprises step (d) in which the crosslinked adhesive layer is transferred onto a support layer.

If the carrier surface is a support layer, the method for producing the self-adhesive article according to the invention can comprise step (d) in which the crosslinked adhesive layer is transferred onto a support layer.

According to a preferred alternative according to the invention, step (d) of the method described above consists of transferring the crosslinked adhesive layer onto a flexible support layer (which can be a plastic film) after cooling the crosslinked adhesive layer to a temperature below the degradation or softening temperature of the material comprising the support layer. According to this alternative, it is possible to manufacture a self-adhesive article comprising a support layer made of a temperature sensitive material, for example a polyolefin-based material as mentioned above.

In one embodiment, the self-adhesive article according to the invention can be obtained using the method described above, with no pre-treatment step of the surface of the support layer. These pre-treatments aim to modify said surface chemically and/or physically in order to increase the surface energy and/or the roughness of said surface and thus improve the adhesion of the adhesive layer to said surface. Examples of known surface treatments include plasma, corona or abrasion treatments, or coating the surface with a chemical adhesion agent (also known as a primer) that is capable enhancing the surface energy of the substrate to which it is applied.

According to one embodiment of the invention, the adhesive layer as described above has an adhesion strength on substrates of different surface energies of at least 3 N/cm, preferably at least 3.5 N/cm, more preferably at least 4 N/cm.

In particular, a self-adhesive article composed of a support layer of 50 μm thick polyethylene terephthalate (PET) film coated with an adhesive layer according to the invention, with a grammage of 50 g/m$^2$, can permanently bond to HDPE or PP, which corresponds to an adhesive strength (measured by the peel test at 1800 (performed according to FINAT standard No. 1) and preferably in the range of 3 to 15 N/cm.

Said adhesion strength can be measured after the self-adhesive article has been exposed to a specific low energy for a certain time, which can range from a few minutes to a few hours or several days, as shown in particular in the examples.

According to one embodiment, the method of manufacturing the self-adhesive article according to the invention also comprises a step (e) in which a second coat of the adhesive composition according to the invention is applied to the support layer, followed by a step (f) crosslinking the adhesive composition applied in step (e) by heating it to a temperature ranging from 20 to 200° C. According to this embodiment, a double-sided self-adhesive article is obtained.

The coating in step (b) can be performed using known coaters, such as a slot nozzle or curtain coater, or even a roller. The grammage used for the adhesive composition ranges from 3 to 2000 g/m$^2$, preferably from 5 to 1000 g/m$^2$, more preferably from 10 to 500 g/m$^2$, or yet more preferably from 12 to 250 g/m$^2$.

The weight of adhesive composition needed for the manufacture of self-adhesive labels can range from 10 to 100 g/m$^2$, preferably 20 to 50 g/m$^2$. That required to manufacture self-adhesive tapes can vary over a much broader range of from 3 to 500 g/m$^2$, preferably from 15 to 250 g/m$^2$ per side According to one embodiment, the coat of adhesive composition is further subjected, in step (c), to a treatment in a humid atmosphere characterized by its moisture content. Preferably, the humid atmosphere is an atmosphere wherein from 2 to 100% of the molecules are water molecules, preferably 4 to 50%, and more preferably from 5 to 10% of the molecules are water molecules.

Moisture content is expressed as a percentage of water per unit volume, which corresponds to the number of water molecules divided by the total number of molecules in a unit volume. Due to the linear nature of this scale, moisture content is easily measured and controlled using, for example, PID (Proportional-Integral-Derivative) monitors. The weight percentage can be calculated by multiplying the percentage of the number of water molecules in relation to the total number of molecules by a factor of 0.622. General information about the moisture in various environments is described by W. Wagner et al, in *International Steam Tables—Properties of Water and Steam based on Industrial Formulation IAPWS-IF97*.

The time required for the crosslinking step (c) can vary widely, for example between 1 second and 30 minutes, depending on the weight of the adhesive composition deposited on the carrier surface, the heating temperature, and the moisture content.

This thermal crosslinking step has the effect of creating—between the polymer chains of the mixture of polysilylated A.1) and A.2) monosilylated polymers as described above and under the action of the moisture content—siloxane links which lead to the formation of a three-dimensional polymeric network. The adhesive composition thus crosslinked is a pressure sensitive adhesive which imparts adhesive strength and the desired tack to the support layer coated with the adhesive.

Preferably, the coating is uniformly carried out on the support layer or the release liner, but the coating can also be adapted to the final shape desired for the self-adhesive article.

According to one embodiment, coating with the adhesive composition is done on at least part of both sides of the support layer. If both sides of the support layer are coated, the adhesive composition can be the same or different on both sides, and the weight can be the same or different on both sides.

According to one embodiment of the invention, the self-adhesive article comprises an adhesive layer on at least part of one face or on at least part of both sides of the support layer, said one or more adhesive layers being optionally coated with a non-stick protective layer. According to one embodiment, the self-adhesive article comprises two anti-adherent protective layers on each of the two adhesive layers. In this case, both protective layers can be of the same or different materials and/or can have the same or different thickness.

The self-adhesive article according to the invention can be used in a bonding method comprising the following steps:

a) removing the release liner when such liner is present;
b) affixing the self-adhesive article onto a surface of a product; and
c) applying pressure on said item.

In step b), the self-adhesive article is applied such that the self-adhesive part of the item (formed by the self-adhesive layer) faces the surface of the product.

According to one embodiment wherein the self-adhesive article is a double sided item, the bonding method also comprises a step in which either a second surface of a product is affixed to the item bonded to the first surface of a product, or article bonded to the first surface of a product is affixed to a second surface of a product.

Product Coated with an Anti-Adhesive Item

The present invention relates thirdly to a product of which the surface is coated with a self-adhesive article according to the invention.

Preferably, said surface has not undergone surface pre-treatments as described previously.

Preferably, said surface has a surface energy of less than or equal to 40 mN/m, preferably from 23 to 38 mN/m, and more preferably from 25 to 35 mN/m.

Preferably, said surface is smooth and uniform.

The surface of the product coated with an auto-adhesive item according to the invention can be made from low surface energy substrates such as polyolefin substrates, which are organic nonpolar substrates, or organic apolar coatings such as varnish, ink or paint, said substrates having a surface energy of less than 40 mN/m, preferably from 23 to 38 mN/m, and more preferably from 25 to 35 mN/m.

Polyolefin-type substrates can, for example, be polymeric materials based on monomers and co-monomers such as polyethylene (PE), polypropylene (PP), polyisoprene (PI), polyisobutylene (PIB) and their copolymers (blocks or random) or based on cyclic olefin polymer(s) such as those obtained by ring-opening metathesis polymerization (ROMP).

Examples of polyethylene (PE) include, in particular, high density polyethylene (HDPE), low density polyethylene (LDPE), linear low density polyethylene and linear ultra-low density polyethylene.

The surface of the product coated with a self-adhesive article according to the invention can be flexible or rigid.

In particular, the product to be coated can have the same flexibility as the support layer described above, so that it can be rolled and packaged in the form of a roll, for example as described above.

Alternatively, the product to be coated cannot be rolled and packaged in the form of a roll, for example as described above, due to its rigidity, its shape or its thickness.

The following examples are provided purely by way of illustration of the invention, and should not be interpreted to limit its scope.

EXAMPLES

The following ingredients were used in the examples:
As disilylated polymer:
PDS 1: Disilylated polymer with a number-average molecular weight of about 16,000 g/mol (or 20 kDa and a PI of approximately 1.6 if determined by GPC), comprising a main polyurethane chain and two hydrolysable propylene trimethoxysilane end groups, said silylated end groups being attached to the main polymer chain by a urethane function. This polymer corresponds in particular to formula (I).

PDS2: Disilylated polymer with a number-average molecular weight of about 37,000 g/mol (or 38 kDa and a PI of approximately 1.9 if determined by GPC), comprising a main polyurethane chain and two hydrolysable propylene trimethoxysilane end groups, said silylated end groups being attached to the main polymer chain by a urethane function. This polymer corresponds in particular to formula (I).

PDS3: GENIOSIL® STP-E 30 (available from Wacker): disilylated polymer with a number-average molecular weight of about 18,500 g/mol (or 22 kDa and a PI of approximately 1.2 if determined by GPC), comprising a main polyurethane chain and two hydrolysable methylene trimethoxysilane end groups, said silylated end groups being attached to the main polymer chain by a urethane function. This polymer corresponds in particular to formula (I).

PDS4: GENIOSIL® STP-E 35 (available from Wacker): disilylated polymer with a number-average molecular weight of about 18,600 g/mol (or 22 kDa and a PI of approximately 1.2 if determined by GPC), comprising a main polyurethane chain and two hydrolysable propylene trimethoxysilane end groups, said silylated end groups being attached to the main polymer chain by a urethane function. This polymer corresponds in particular to formula (I).

As monosilylated polymer:
PMS1 GENIOSIL®XM20 (available from Wacker): monosilylated polymer with an average molecular weight of about 6000 g/mol (or 8 kDa when determined by GPC), and a PI of approximately 1.1. It comprises a main chain of polyether and a hydrolysable methylene-methyldimethoxysilane end group, said silylated end group being attached to the main polymer chain by a urethane function. This polymer corresponds in particular to formula (IIbis) wherein m=0 and p=1

PMS2: GENIOSIL®XM25 (available from Wacker): monosilylated polymer with an average molecular weight of about 6000 g/mol (or 8 kDa when determined by GPC), and a PI of approximately 1.1. It comprises a main chain of polyether and a hydrolysable methylene-methyltrimethoxysilane end group, said silylated end group being attached to the main polymer chain by a urethane function. This polymer corresponds in particular to formula (IIbis) wherein m=0 and p=0

As tackifying resin:
T1: Sylvalite® RE 100 (available from Arizona Chemical) which is a rosin and pentaerythritol resin with an OHI of about 50 mg KOH/g, a number-average molecular mass of about 974 g/mol, and a softening point of 100° C. (type (iii) tackifying resin);

T2: DERTOPHENE® H 150 (available from DRT): terpene phenol resin, with an OHI of about 150 mg KOG/g, a number-average molecular mass of about 700 g/mol and a softening point of 120° C.;

T3: NORSOLENE® W85 (available from CRAY VALLEY): alpha methyl styrene resin with an OHI of 0, a number-average molecular mass of about 600 g/mol, and a softening point of 85° C. (type (ii) tackifying resin);

T4: NORSOLENE® W10 (available from CRAY VALLEY): alpha methyl styrene resin with an OHI of 0, a number-average molecular mass of about 750 g/mol, and a softening point of 110° C. (type (ii) tackifying resin);

T5: PICCO® AR 100 (available from EASTMAN): resin obtained by polymerisation of mixtures of aromatic hydrocarbons with mainly 9 carbon atoms and an OHI of 0, a number-average molecular mass of 550 g/mol, and a softening point of 100° C. (type (i) tackifying resin).

As crosslinking catalyst:
K-KAT® 5218 (available from King Industries): contains aluminium chelate.

I—of Disilylated Polymers A.1)
Synthesis of PDS1:
The following was placed in a glass reactor:
961.2 g (0.1199 mol) of ACCLAIM® 8200, poly(oxypropylene)diol;
12.99 g (0.0582 mol) of isophorone diisocyanate (IPDI); corresponding to a molar ratio of the NCO/OH functions equal to 0.5; and
0.29 g (corresponding to 300 ppm) of a neodecanoate bismuth and zinc catalyst (commercially available from Borchers, under the name Borchi Kat VP 0244).

This mixture was kept under constant mixing at 85° C. and under nitrogen for 3 hours until complete reaction of the NCO functions of the IPDI.

To the hydroxyl-end polyurethane thus obtained was then added 26.05 g (0.1269 mol) of gamma-isocyanato-n-propyl-trimethoxysilane and the mixture was maintained at 85° C. until complete disappearance of the NCO functions.

The resulting polyurethane had a viscosity of about 55 Pa·s. (measured with a Brookfield viscometer at 23° C., with a No. 7 needle rotating at 20 rpm) and an average molecular weight of about 16,000 g/mol (or a 20 kDa and a polymolecularity index of about 1.6 determined by GPC).

Synthesis of PDS2:
The following was placed in a glass reactor:
884.63 g (0.0457 mol) of ACCLAIM® 18200 poly(oxypropylene) diol;
5.10 g (0.0229 mol) of isophorone diisocyanate (IPDI); corresponding to a molar ratio of the NCO/OH function numbers equal to 0.5; and
300 ppm of a neodecanoate bismuth and zinc catalyst (commercially available from Borchers, under the name Borchi Kat VP 0244).

This mixture was kept under constant mixing at 85° C. and under nitrogen for 3 hours until complete reaction of the NCO functions of the IPDI.

To the hydroxyl-end polyurethane thus obtained was then added 10 g (0.0474 mol) of gamma-isocyanato-n-propyl-trimethoxysilane and the mixture was maintained at 85° C. until complete disappearance of the NCO functions.

The resulting polyurethane had a viscosity of about 510 Pa·s. (measured with a Brookfield viscometer at 23° C., with a No. 7 needle rotating at 20 rpm) and an average molecular weight of about 37,000 g/mol (or a 38 kDa and a polymolecularity index of about 1.9 determined by GPC).

II—Preparation of the Adhesive Compositions
Adhesive compositions 1 to 14 and CE1 to CE8 were prepared following the same procedure described below, using the ingredients listed in Table 1 below. The amounts of each ingredient used are indicated in percent by weight in relation to the total weight of the adhesive composition.

Compositions 1 to 14 correspond to the adhesive compositions according to the invention.

Compositions CE1 to CE 8 correspond to comparative adhesive compositions. In particular:
compositions CE1 and CE2 correspond to compositions in Examples A of WO 09/106699 and EP 2336208 respectively, comprising a single disilylated polymer A.1 and a tackifying resin with an OH value greater than 100 mg KOH/g, Compositions CE3 to CE 6 correspond to comparative compositions comprising a single disilylated polymer A.1).

Compositions CE7 to CE 8 correspond to comparative compositions comprising a single monosilylated polymer A.2).

Operating Procedure:
The adhesive composition was prepared by first placing the tackifying resin in a vacuum glass reactor and heated to about 140° C. Then, when the resin had melted, the silylated polymer A. 1) or A.2) or the mixture of silylated polymers A.1) and A.2) was added.

The mixture was mixed under vacuum for 15 minutes, then cooled to 80° C. The catalyst was then introduced. The mixture was kept under vacuum and mixed for a further 10 minutes.

The viscosity of the mixture was then determined at 100° C., using a Brookfield type viscometer (equipped with Thermosel system for high temperature viscosity measurements), fitted with an A28 needle rotating at a speed suited to the sensitivity of sensor. For examples 1 to 14 according to the invention and the comparative examples, the mixtures had a viscosity ranging from 0.5 Pas. to 40 Pa·s, measured at 100° C.

II—Preparation of the Self-Adhesive Articles
Each of the adhesive compositions 1 to 14 and CS 1 to CE8 was used to manufacture a self-adhesive article by following the operating procedure below.

Operating Procedure:
As a support layer, a 20 cm×40 cm, rectangular sheet of Polyethyleneterephthalate (PET) film 50 μm thick was used.

The adhesive composition was preheated to a temperature close to 90° C. and placed in a cartridge from which a bead was extruded which was deposited close to the edge of the sheet parallel to its width.

The adhesive composition contained in this cord was then spread over the entire surface of the sheet, so as to obtain a uniform layer of substantially consistent thickness. This was done using a film drawer (also referred to as film applicator) which was moved from one edge of the sheet to the opposite edge. In this way, a layer of adhesive composition corresponding to a grammage of 50 g/m$^2$, representing approximately a thickness of the order of 50 tam, was deposited.

The PET sheet thus coated was then placed in an oven at 120° C. for 600 seconds for crosslinking, then laminated onto another sheet of PET film the surface of which was treated with silicone for use as a rectangular, non-stick surface of equal size.

The self-adhesive article thus obtained comprising the crosslinked pressure-sensitive adhesive layer on the PET substrate was subjected to the tests described below.

III—Bonding Test of the Self-Adhesive Articles
The self-adhesive articles prepared above were subjected to the same conditions following bonding tests on two types of polyolefin substrates: HDPE and PP. The surface energy of the substrates in contact with the adhesive tested was 27 and 29 mN/m, respectively, for the HDPE and PP. These values were determined using the measurement method described below.

Determining the Surface Energy of the Substrates:
The surface energy of each substrate was determined from the measurement of the contact angle of standard solutions on the surface of said substrates. The substrates tested were HDPE plates or flat surface PP, smooth and uniform, of 15 cm long and 2.5 cm wide.

The contact angle was measured for three standard solutions (diiodomethane, ethylene glycol and water) with a Digidrop device fitted with a set of syringes for depositing the standard solutions. The device used to measure the contact angle was connected to Windrop++ software by GBX Scientific Instrument to calculate the surface energy of the substrate from the contact angle measured The measurements were performed in the open air in a room at 23° C. and a relative humidity of 50% under atmospheric pressure of 1 bar.

Preparing the substrates: The substrate was affixed to a glass plate 15 cm long and 5 cm wide with a layer of double-sided adhesive tape of same dimensions as the substrate and covering the entire surface of said substrate, aligning at least one of the corner of the layers composed of the substrate, adhesive tape and glass plate. The sample thus formed was smoothed to obtain a smooth, bubble-free surface. The sample was placed under the Digidrop device so that the filling needles were facing the surface of the sample substrate and aligned as close as possible with the sample edge.

Measuring the contact angle: The Windrop++ software launches the drop programme that will simultaneously trigger the deposit of a drop of a standard solution and automatically capture an image of the drop in contact with the surface of the substrate. The picture is taken at 13,000 milliseconds (ms) for the water and ethylene glycol, and at 2000 ms for the diiodomethane after the program starts. For each standards solution, three drops are deposited. Between each drop, the sample is manually displaced such that the drops are deposited in near each other on the surface of the substrate, close to the sample edge. The drop order is as follows: 3 drops of water, 3 drops of ethylene glycol, 3 drops of diiodomethane.

Calculation of the contact angle and determination of substrate surface energy: From each of the captures taken, a contact angle is calculated using the "Manual 2" method. Thus, for each standard solution, three contact angle values are obtained. The surface energy of the substrate (EN1) was calculated by applying the Owen & Wendt model to the contact angle values found.

A second series of contact angle measurements was performed for each standard solution. As before, the contact angles were measured for three drops of each standard solution in the aforementioned order and then a second surface energy value (EN2) was obtained.

A third series of contact angle measurements was performed for each standard solution, then a second surface energy value (EN3) was obtained.

The surface energy for the substrate was obtained by averaging the three values EN1, EN2 and EN3.

Peel Test at 1800 on Polyolefin (HDPE, PP):

Adhesion is assessed by the peel test at 1800 as described in FINAT Method No. 1, published in the FINAT Technical Handbook, 6$^{th}$ edition, 2001, on polyolefin. FINAT is the international federation of manufacturers and converters of self-adhesive labels. The principle of the test is as follows.

A test piece in the form of a rectangular strip (25 mm×175 mm) is cut from the PET support layer coated with the crosslinked composition constituting the self-adhesive article obtained above. After preparation, this test piece is stored for 24 hours at a temperature of 23° C. and in an atmosphere at 50% relative humidity. It is then affixed over ⅔ of its length (after removal of the portion corresponding to the protective release liner) to a substrate consisting of a HDPE or PP plate. The resulting assembly is left 20 minutes at room temperature (23° C.). It is then placed in a traction device capable, from the remaining free end of the rectangular strip, of peeling or detaching the strip at an angle of 180° and a separation speed of 300 mm/minute. The device measures the force required to peel the tape in these conditions.

Results:

The measurement results are expressed in N/cm and are listed in Table 2 below. It was found that the adhesive compositions in examples 1 to 14 according to the invention provide a self-adhesive article with an adhesive strength superior to the comparative adhesive compositions in examples CE1 to CE6. Compositions CE7 and CE8 did not enable a cross-linked, self-adhesive article to be obtained in the desired field and demonstrate the need to combine a disilylated polymer with a monosilylated polymer.

The excellent adhesive performances of the adhesive compositions according to the invention on the set of low energy surface substrates tested are the result of a synergy between the different ingredients.

In particular, the following series of comparisons have shown that:

1) the use of a mixture of polymers A1) and A.2) leads to improved adhesive performance on all the low energy surface substrates tested in comparison to the use of polymer A.1) alone:
   series (1.1): comparison of comparative composition CE3 with each of the compositions in examples 3, 4, 6, 9 and 10 according to the invention;
   series (1.2): comparison of comparative composition CE5 with the composition in example 13 according to the invention;
   series (1.3): comparison of comparative composition CE6 with the composition in example 14 according to the invention, 2) the use of a mixture of polymers A1) and A.2) leads to improved adhesive performance on all the low energy surface substrates tested in comparison to the use of polymer A.2) alone:
   series (2.1): comparison of comparative composition CE7 with each of the compositions in examples 4, 10, 12, 13 and 14 according to the invention;
   series (2.2): comparison of comparative composition CE8 with each of the compositions in examples 3, 6, 9 and 11 according to the invention;

3) the use of a higher content in monosilylated polymer A2) in the mixture of polymers A1) and A2) leads to improved adhesive performance on all the low energy surface substrates tested:
   series (3.1): comparison of the composition in example 12 and example 11;
   series (3.2): comparison of the composition in example 3 and example 9; 4) the use of a higher content in disilylated polymer A1) in the mixture of polymers A1) and A2) leads to improved adhesive performance on all the low energy surface substrates tested, for polymers of the same type:
   series (4.1): comparison of the composition of example 12 and example 3;
   series (4.2): comparison of the composition of example 11 and example 9;

5) the use of a higher content in disilylated polymer A1) of formula (II) wherein m is not zero leads to improved adhesive performance on all the low energy surface substrates tested, in comparison to a disilylated polymer A.1) of formula (II) wherein m is zero, for silylates with comparable number-average molecular mass and end groups:
   series (5.1): comparison of the composition in example 4 and example 13;

6) the use of a disilylated polymer A1) comprising dialkoxysilane end groups leads to improved adhesive performance on PP, in comparison to a disilylated polymer A.1) comprising trialkoxysilane end groups, in a mixture with a similar dialkoxysilylated monosilylated polymer A.2):
   series (6.1): comparison of the compositions in examples 14 and 13;
7) the use of a monosilylated polymer A.2) comprising dialkoxysilylated end groups leads to improved adhesive performance on at least PP, in comparison to a monosilylated polymer A.2) comprising trialkoxysilylated end groups, in a mixture with a similar disilylated polymer A.1):
   series (7.1): comparison of the compositions in examples 10 and 9: the use of an A.2) polymer comprising dialkoxysilane end groups improves the adhesion on HDPE and PP in comparison to the use of an A.2) polymer comprising trialkoxysilane end groups;
   series (7.2): comparison of the compositions in examples 4 and 3 according to the invention: the use of an A.2) polymer comprising dialkoxysilane end groups improves the adhesion on PP in comparison to the use of an A.2) polymer comprising trialkoxysilane end groups;
8) the use of at least one type (i) resin (T5), and preferably at least one type (i) and type (ii) resin (T5+T4 or T5+T3), leads to improved adhesive performance on at least PP, in comparison to the use of a mixture of tackifying resins which does not comprise the aforementioned types;
   series (7.1): comparison of the compositions in example 1 and 9 according to the invention: the mixture of T5 and T4 improves PP and HDPE with respect to the mixture of T1 et T4;
   series (7.2): comparison of the compositions in example 2 and 4 according to the invention: the mixture of T5 and T4 improves PP and HDPE with respect to the mixture of T1 et T4;
   series (7.3): comparison of the compositions in example 2 and 5 according to the invention: the mixture of T5 and T3 improves PP and HDPE with respect to the mixture of T1 and T3.

TABLE 1

| | | Ex1 | Ex2 | Ex3 | Ex4 | Ex5 | Ex6 | Ex7 | Ex8 | Ex9 | Ex10 | Ex11 |
|---|---|---|---|---|---|---|---|---|---|---|---|---|
| (A.1) | PDS1 | 31 | 22.5 | 22.5 | 22.5 | 22.5 | 17.5 | 23 | 19.5 | 31 | 31 | — |
| | PDS2 | — | — | — | — | — | — | — | — | — | — | 31 |
| | PDS3 | — | — | — | — | — | — | — | — | — | — | — |
| | PDS4 | — | — | — | — | — | — | — | — | — | — | — |
| (A.2) | PMS1 | — | 21.5 | — | 21.5 | 21.5 | — | — | — | — | 13 | — |
| | PMS2 | 13 | — | 21.5 | — | — | 26.5 | 36 | 19.5 | 13 | — | 13 |
| (B) | T1 | 27.1 | 27.1 | — | — | — | — | — | — | — | — | — |
| | T2 | — | — | — | — | — | — | — | — | — | — | — |
| | T3 | — | — | — | — | 27.1 | — | — | — | — | — | — |
| | T4 | 27.1 | 27.1 | 27.1 | 27.1 | — | 27.1 | 19.6 | 29.6 | 27.1 | 27.1 | 27.1 |
| | T5 | — | — | 27.1 | 27.1 | 27.1 | 27.1 | 19.6 | 29.6 | 27.1 | 27.1 | 27.1 |
| (C) | Catalyst | 1.8 | 1.8 | 1.8 | 1.8 | 1.8 | 1.8 | 1.8 | 1.8 | 1.8 | 1.8 | 1.8 |

| | | Ex12 | Ex13 | Ex14 | CE1 | CE2 | CE3 | CE5 | CE6 | CE7 | CE8 |
|---|---|---|---|---|---|---|---|---|---|---|---|
| (A.1) | PDS1 | — | — | — | 53.7 | — | 44 | — | — | — | — |
| | PDS2 | 22.5 | — | — | — | — | — | — | — | — | — |
| | PDS3 | — | — | 22.5 | — | 53.7 | — | — | 45 | — | — |
| | PDS4 | — | 22.5 | — | — | — | — | 44 | — | — | — |
| (A.2) | PMS1 | — | 21.5 | 21.5 | — | — | — | — | — | 44 | — |
| | PMS2 | 21.5 | — | — | — | — | — | — | — | — | 44 |
| (B) | T1 | — | — | — | — | — | — | — | — | — | — |
| | T2 | — | — | — | 44.7 | 44.7 | — | — | — | — | — |
| | T3 | — | — | — | — | — | — | — | — | — | — |
| | T4 | 27.1 | 27.1 | 27.1 | — | — | 27.1 | 27.1 | 27.3 | 27.1 | 27.1 |
| | T5 | 27.1 | 27.1 | 27.1 | — | — | 27.1 | 27.1 | 27.2 | 27.1 | 27.1 |
| (C) | Catalyst | 1.8 | 1.8 | 1.8 | 1.6 | 1.6 | 1.8 | 1.8 | 0.5 | 1.8 | 1.8 |

TABLE 2

| | | Ex1 | Ex2 | Ex3 | Ex4 | Ex5 | Ex6 | Ex7 | Ex8 | Ex9 | Ex10 | Ex11 |
|---|---|---|---|---|---|---|---|---|---|---|---|---|
| Peel test at | HDPE (≥3 N/cm) | 4 | 5.6 | 5.6 | 4.8 | 5.2 | 4.8 | 4.4 | 4 | 4.3 | 4.8 | 5.6 |
| | PP (≥4 N/cm) | 4.4 | 7.8 | 8.6 | 12 | 11.2 | 7.2 | 6.4 | 12.4 | 7.5 | 8.4 | 8.4 |

| | | Ex12 | Ex13 | Ex14 | CE1 | CE2 | CE3 | CE5 | CE6 | CE7 | CE8 |
|---|---|---|---|---|---|---|---|---|---|---|---|
| Peel test at | HDPE (≥3 N/cm) | 6 | 4.4 | 5.6 | 2.2 | 1.6 | 3.2 | 2 | 2 | NA | NA |
| | PP (≥4 N/cm) | 12 | 7.6 | 10 | 1.2 | 0.8 | 2.8 | 3.6 | 3.6 | NA | NA |

NA: not applicable as it is impossible to coat according the method described

The invention claimed is:

1. An adhesive composition comprising:
   A1) at least 4% by weight of one or more polysilylated polymers with a number-average molecular mass (Mn) of at least 6000 g/mol, wherein the one or more polysilylated polymers comprise a main polyether and/or polyurethane chain and at least two hydrolysable silylated end groups, said hydrolysable silylated end groups being attached to the main polymer chain by a urethane or ether function ("connecting group"); and
   A2) at least 13% by weight of one or more monosilylated polymers with an average molecular weight (Mn) of at least 1000 g/mol, wherein the one or more monosilylated polymers comprise a main polyether and/or polyurethane chain and a hydrolysable silylated end group, said hydrolysable silylated end group being attached to the main polymer chain by a urethane or ether function ("connecting group"); and
   B) at least 25% by weight of one or more tackifying resins, wherein each of the one or more tackifying resins comprises a hydroxyl index of less than or equal to 50 and comprise a number-average molecular mass ranging from 100 to 6000 g/mol, and are chosen among:
      i. resins obtained by polymerization or copolymerization, optionally by hydrogenation, of mixtures of unsaturated aliphatic and/or aromatic hydrocarbons comprising approximately 5, 9 or 10 carbon atoms derived from petroleum fractions;
      ii. resins obtained by a process comprising the polymerization of alpha methyl styrene or copolymerization of alpha methyl styrene with other hydrocarbon monomers;
      iii. rosins of natural origin or modified rosins; and mixtures thereof; and
   C) at least 0.2% of one or more crosslinking catalysts, wherein the contents in % by weight are expressed relative to the total weight of the adhesive composition, and the sum of the contents of all the ingredients of the adhesive compositions is 100%.

2. The composition according to claim 1, wherein the polysilylated polymer A1) or at least one of the polysilylated polymers A1), corresponds to the following formula (I) or (II), or mixtures thereof:
   formula (I):

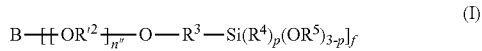

wherein:
   B represents a divalent (for $f=2$) or trivalent (for $f=3$), linear, branched, cyclic, alicyclic or aromatic, saturated or unsaturated hydrocarbon radical containing from 2 to 66 carbon atoms, optionally comprising one or more heteroatoms;
   $R^3$ represents a linear or branched divalent alkylene radical comprising from 1 to 6 carbon atoms;
   $R'^2$ represents a linear or branched divalent alkylene radical comprising from 2 to 4 carbon atoms;
   $R^4$ and $R^5$, identical or different, each represent a linear or branched alkyl radical comprising 1 to 4 carbon atoms; $R^4$ can optionally be engaged in a ring;
   n" is a non-zero integer such that the number-average molecular mass of the polyether block of formula —[$OR'^2$]$_{n''}$— ranges from 150 g/mol to 20,000 g/mol;
   p is an integer equal to 0 or 1;
   f is an integer equal to 2 or 3; and
   the n" and f indexes are such that the number-average molecular mass of the polysilylated polymers A1) is as defined in claim 1;
   formula (II):

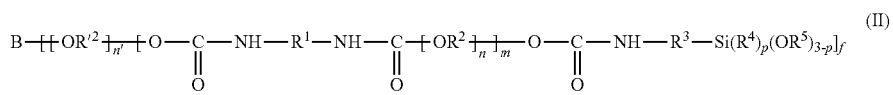

wherein:
   B represents a divalent (for $f=2$) or trivalent (for $f=3$), linear, branched, cyclic, alicyclic or aromatic, saturated or unsaturated hydrocarbon radical containing from 2 to 66 carbon atoms, optionally comprising one or more heteroatoms;
   $R^1$ represents a divalent hydrocarbon radical comprising from 5 to 15 carbon atoms, which can be aliphatic or aromatic, linear, branched or cyclic;
   $R^3$ represents a linear or branched divalent alkylene radical comprising from 1 to 6 carbon atoms;
   $R^2$ and $R'^2$, identical or different, each represent a linear or branched divalent alkylene radical comprising from 2 to 4 carbon atoms;
   $R^4$ and $R^5$, identical or different, each represent a linear or branched alkyl radical comprising 1 to 4 carbon atoms; $R^4$ can optionally be engaged in a ring;
   n is a non-zero integer such that the number-average molecular mass of the polyether block of formula —[$OR^2$]$_n$— ranges from 300 g/mol to 40,000 g/mol;
   n' is a zero or non-zero integer such that the number-average molecular mass of the polyether block of formula —[$OR'^2$]$_{n'}$— ranges from 0 g/mol to 20,000 g/mol;
   m is a zero or non-zero integer;
   p is an integer equal to 0 or 1;
   f is an integer equal to 2 or 3; and
   the m, n, n' and f indexes are such that the number-average molecular mass of the polysilylated polymers A1) is as defined in claim 1.

3. The composition according to claim 2, wherein the polysilylated polymer(s) A1) correspond to formula (II), wherein m is not null.

4. The composition according to claim 2, wherein p=0.

5. The composition according to claim 2, wherein p=1.

6. The composition according to claim 1, wherein the monosilylated polymer A2) or at least one of the monosilylated polymers A2), corresponds to the following formula (Ibis) or (IIbis), or mixtures thereof:

formula (Ibis):

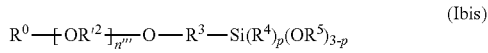

wherein:
- $R^0$ represents a divalent hydrocarbon radical comprising from 1 to 60 carbon atoms, which can be aliphatic, aromatic or alkyl aromatic, linear, branched or cyclic;
- $R^3$ represents a linear or branched divalent alkylene radical comprising from 1 to 6 carbon atoms;
- $R'^2$ represents a linear or branched divalent alkylene radical comprising from 2 to 4 carbon atoms;
- $R^4$ and $R^5$, identical or different, each represent a linear or branched alkyl radical comprising 1 to 4 carbon atoms; $R^4$ can optionally be engaged in a ring;
- n''' is a zero or non-zero integer such that the number-average molecular mass of the polyether block of formula $—[OR'^2]_{n'''}—$ ranges from 0 g/mol to 20,000 g/mol;
- p is an integer equal to 0, 1 or 2; and
- $R^0$ and n''' are such that the number-average molecular mass of the monosilylated polymers A2) is as defined in claim 1;

formula (IIbis):

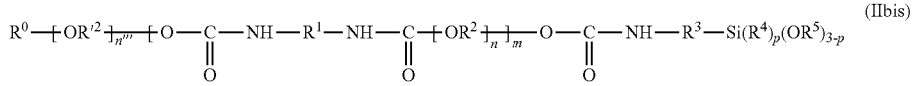

wherein:
- $R^0$ represents a divalent hydrocarbon radical comprising from 1 to 60 carbon atoms, which can be aliphatic, aromatic or alkyl aromatic, linear, branched or cyclic;
- $R^1$ represents a divalent hydrocarbon radical comprising from 5 to 15 carbon atoms, which can be aliphatic or aromatic, linear, branched or cyclic;
- $R^3$ represents a linear or branched divalent alkylene radical comprising from 1 to 6 carbon atoms;
- $R^2$ and $R'^2$, identical or different, each represent a linear or branched divalent alkylene radical comprising from 2 to 4 carbon atoms;
- $R^4$ and $R^5$, identical or different, each represent a linear or branched alkyl radical comprising 1 to 4 carbon atoms; $R^4$ can optionally be engaged in a ring;
- n is an integer such that the number-average molecular mass of the polyether block of formula $—[OR^2]_n—$ ranges from 300 g/mol to 40,000 g/mol;
- n''' is a zero or non-zero integer such that the number-average molecular mass of the polyether block of formula $—[OR'^2]_{n'''}—$ ranges from 0 g/mol to 20,000 g/mol;
- m is a zero or non-zero integer;
- p is an integer equal to 0, 1 or 2; and
- $R^0$ and the m, n, and n''' indexes are such that the number-average molecular mass of the monosilylated polymers A.2) is as defined in claim 1.

7. The composition according to claim 6, wherein the monosilylated polymer(s) A2) correspond to formula (IIbis), wherein m is null.

8. The composition according to claim 1, wherein the polysilylated polymer(s) A1) is (are) disilylated.

9. The composition according to claim 1, wherein:
- the polysilylated polymer(s) A1) has (have) a number-average molecular mass (Mn) of from 6000 to 55,000 g/mol; and
- the monosilylated polymer(s) A2) has (have) a number-average molecular mass of from 1000 to 55,000 g/mol.

10. The composition according to claim 1, wherein:
- the content in polysilylated polymers(s) A1) is from 5 to 59.8% by weight, for the weight of the adhesive composition;
- the content in monosilylated polymers(s) A2) is from 15 to 69.8% by weight, for the weight of the adhesive composition;
- the content in tackifying resin(s) B) is from 25 to 79.8% by weight, for the weight of the adhesive composition; and
- the content in crosslinking catalyst C) ranges from 0.2 to 4% by weight of the weight of the adhesive composition.

11. A self-adhesive article comprising a support layer coated with a self-adhesive layer, said self-adhesive layer consisting of an adhesive composition as defined in claim 1, in the crosslinked state.

12. The self-adhesive article according to claim 11, which can be obtained by a process comprising the following steps:
a) packaging of an adhesive composition at a temperature ranging from 20 to 130° C.; then
b) coating a carrier surface with the adhesive composition obtained in step (a); then
c) crosslinking the coated adhesive composition by heating it to a temperature ranging from 20 to 200° C. in a gaseous environment comprising from 10 to 200 mg of water molecules per m³ of gas; and
d) laminating or transferring the crosslinked adhesive layer onto a support layer or a non-stick release film; wherein said support layer or release film can be the back side of the carrier surface, and wherein the adhesive composition comprises:
  A1) at least 4% by weight of one or more polysilylated polymers with a number-average molecular mass (Mn) of at least 6000 g/mol, wherein the one or more polysilylated polymers comprise a main polyether and/or polyurethane chain and at least two hydrolysable silylated end groups, said hydrolysable silylated end groups being attached to the main polymer chain by a urethane or ether function ("connecting group"); and
  A2) at least 13% by weight of one or more monosilylated polymers with an average molecular weight (Mn) of at least 1000 g/mol, wherein the one or more monosilylated polymers comprise a main polyether and/or polyurethane chain and a hydrolysable silylated end group, said hydrolysable silylated end group being attached to the main polymer chain by a urethane or ether function ("connecting group"); and B) at least 25% by weight of one or more tackifying resins, wherein each of the one or more tackifying resins comprises a hydroxyl index of less than or equal to 100; and C) at least 0.2% of one or more crosslinking catalysts, wherein the contents in % by weight are expressed relative to the total weight of the adhesive composition, and the sum of the contents of all the ingredients of the adhesive compositions is 100%.

13. The self-adhesive article according to claim 11, wherein the support layer has an elongation at break of strictly less than 100% and is based on acrylic polymers, polyethylene (PE), oriented, non-oriented or bi-oriented polypropylene (PP), polyimide, polyurethane, polyester or paper.

14. A product to the surface of which has been affixed the self-adhesive article as defined in claim 11, said surface having a surface energy less than or equal to 40 mN/m, said surface energy being measured at 23° C., 50% relative humidity, atmospheric pressure of 1 bar, in air.

* * * * *